US011531128B2

(12) United States Patent
Halliday

(10) Patent No.: US 11,531,128 B2
(45) Date of Patent: Dec. 20, 2022

(54) RECONSTRUCTION OF MULTI-SHOT, MULTI-CHANNEL SEISMIC WAVEFIELDS

(71) Applicant: Schlumberger Technology Corporation, Sugar Land, TX (US)

(72) Inventor: David Halliday, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 282 days.

(21) Appl. No.: 16/648,805

(22) PCT Filed: Sep. 14, 2018

(86) PCT No.: PCT/US2018/051085
§ 371 (c)(1),
(2) Date: Mar. 19, 2020

(87) PCT Pub. No.: WO2019/060220
PCT Pub. Date: Mar. 28, 2019

(65) Prior Publication Data
US 2020/0217977 A1    Jul. 9, 2020

Related U.S. Application Data

(60) Provisional application No. 62/563,053, filed on Sep. 25, 2017.

(51) Int. Cl.
*G01V 1/28*    (2006.01)
*G01V 1/32*    (2006.01)
(Continued)

(52) U.S. Cl.
CPC .............. *G01V 1/282* (2013.01); *G01V 1/325* (2013.01); *G01V 1/364* (2013.01); *G01V 1/3808* (2013.01);
(Continued)

(58) Field of Classification Search
CPC ........ G01V 1/282; G01V 1/325; G01V 1/364; G01V 1/3808; G01V 2210/127;
(Continued)

(56) References Cited

U.S. PATENT DOCUMENTS 10,126,452 B2 * 11/2018 Halliday .............. G01V 1/3861
10,928,535 B2 * 2/2021 Halliday .............. G01V 1/3808
(Continued)

FOREIGN PATENT DOCUMENTS

WO    2015143189 A1    9/2015
WO    2015168130 A1    11/2015

OTHER PUBLICATIONS

Vassallo et al. (Crossline wavefield reconstruction from multicomponent streamer data: Part 1—Multichannel interpolation by matching pursuit (MIMAP) using pressure and its crossline gradient, 2010) (Year: 2020).*

(Continued)

*Primary Examiner* — Mohammad K Islam

(57) ABSTRACT

A method for seismic imaging includes receiving a multi-shot seismic data set that was collected using one or more streamers having recorders configured to detect seismic waves that propagate through a subterranean domain. The method also includes partitioning the multi-shot seismic data set into windows including a source dimension. The method also includes defining one or more first basis functions that describe the windows of the multi-shot seismic data set. The method also includes generating a model that describes a decomposition of the multi-shot seismic data set using the one or more first basis functions. The method also includes defining one or more second basis functions that describe a selected output data. The method also includes combining (Continued)

the one or more second basis functions with the model to produce a result for a source side wavefield and a receiver side wavefield.

18 Claims, 11 Drawing Sheets

(51) Int. Cl.
  *G01V 1/36* (2006.01)
  *G01V 1/38* (2006.01)
(52) U.S. Cl.
  CPC .......... *G01V 2210/127* (2013.01); *G01V 2210/1423* (2013.01); *G01V 2210/43* (2013.01); *G01V 2210/56* (2013.01); *G01V 2210/67* (2013.01)
(58) Field of Classification Search
  CPC ....... G01V 2210/1423; G01V 2210/43; G01V 2210/56; G01V 2210/67; G01V 1/28; G01V 1/30; G01V 1/307; G01V 1/20; G01V 1/306; G01V 1/3843; G01V 1/42; G01V 2210/62
  See application file for complete search history.

(56) References Cited

U.S. PATENT DOCUMENTS

| | | | |
|---|---|---|---|
| 2010/0211322 A1 | 8/2010 | Vassallo et al. | |
| 2012/0014214 A1* | 1/2012 | Artman | G01V 1/282 367/25 |
| 2012/0316850 A1* | 12/2012 | Liu | G01V 1/302 703/6 |
| 2014/0029379 A1* | 1/2014 | Roger | G01V 1/3826 367/16 |
| 2014/0142859 A1* | 5/2014 | Lu | G01V 1/282 702/16 |
| 2015/0234065 A1* | 8/2015 | Lecocq | G01V 1/366 702/14 |
| 2015/0293241 A1* | 10/2015 | Hegna | G01V 1/28 367/14 |
| 2016/0161621 A1* | 6/2016 | Salama | G01V 1/364 702/17 |
| 2018/0143338 A1 | 5/2018 | Halliday | |
| 2018/0335534 A1* | 11/2018 | Poole | G01V 1/282 |

OTHER PUBLICATIONS

International Preliminary Report on Patentabilitiy of PCT Application No. PCT/US2018/051085, dated Apr. 9, 2020 (7 pages).
International Search Report and Written Opinion of International Patent Application No. PCT/US2018/051085, dated Nov. 21, 2018 (10 pages).
Michel Schonewille, Zhimei Yan, Martin Bayly, and Richard Bisley (2013) Matching pursuit Fourier interpolation using priors derived from a second data set. SEG Technical Program Expanded Abstracts 2013: pp. 3651-3655.
Moore et al., 2009, Simultaneous source separation using dithered sources. SEG Technical Program Expanded Abstracts 2008: pp. 2806-2810.
Extended European Search Report dated May 26, 2021 for the equivalent patent application published 3688497 (7 pages).

\* cited by examiner

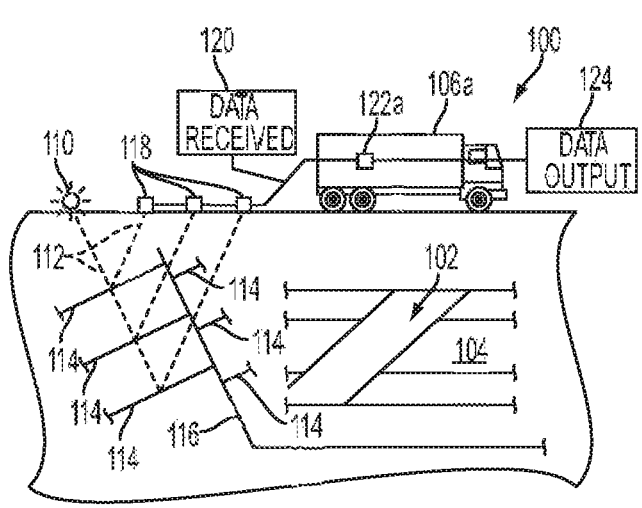
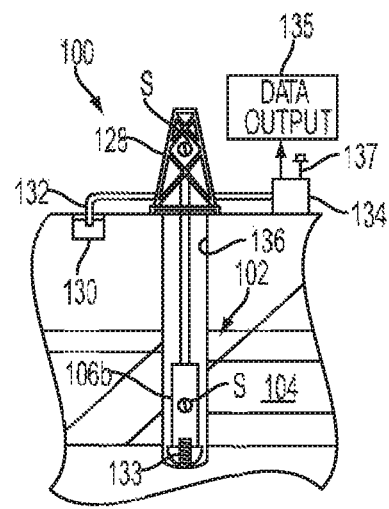
FIG. 1A　　　FIG. 1B
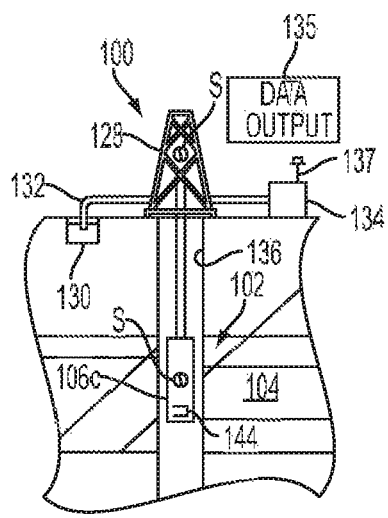
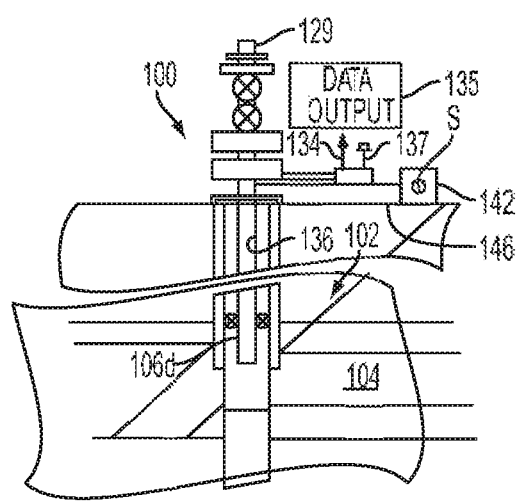
FIG. 1C　　　FIG. 1D

RECONSTRUCTION OF MULTI-SHOT, MULTI-CHANNEL SEISMIC WAVEFIELDS

CROSS-REFERENCE TO RELATED APPLICATIONS

This application claims priority to U.S. Provisional Patent Application No. 62/563,053, filed on Sep. 25, 2017, the entirety of which is hereby incorporated by reference.

BACKGROUND

Seismic data can be collected using multiple streamers and/or multiple sources. The data acquired may be used for wavefield reconstruction. In wavefield reconstruction using multi-measurement steamers, recordings of pressure and horizontal and vertical pressure gradients allow the wavefield at locations between the streamers to be reconstructed, even though no physical streamer was present at those locations. The reconstructed wavefield can be the total pressure wavefield, the up-going wavefield, and/or the downgoing wavefield.

The wavefield can be reconstructed in overlapping blocks of data. For receiver-side processing, the individual blocks may be defined by a number of recording channels in a streamer cable, a number of streamer cables, and a fixed time duration. Overlapping windows may be processed for one shot gather, and the reconstructed data for that shot gather may be output, before moving to the next shot gather. That is, each shot gather can be processed individually.

SUMMARY

A method for seismic imaging is disclosed. The method includes receiving a multi-shot seismic data set that was collected using one or more streamers having recorders configured to detect seismic waves that propagate through a subterranean domain. The method also includes partitioning the multi-shot seismic data set into windows including a source dimension. The method also includes defining one or more first basis functions that describe the windows of the multi-shot seismic data set. The method also includes generating a model that describes a decomposition of the multi-shot seismic data set using the one or more first basis functions. The method also includes defining one or more second basis functions that describe a selected output data. The method also includes combining the one or more second basis functions with the model to produce a result for a source side wavefield and a receiver side wavefield.

In another embodiment, the method includes receiving a multi-shot seismic data set that was collected using one or more streamers having recorders configured to detect seismic waves that propagate through a subterranean domain. The method also includes partitioning the seismic data set into windows including a source dimension. The method also includes defining a first basis function based on data in one of the windows for individual sources. The method also includes defining a second basis function that describes data for multiple sources in the one of the windows. The method also includes decomposing the data into a first spectrum for the individual sources in the one of the windows using the first basis function. The method also includes estimating a second spectrum based on the first spectrum and the second basis function. The method also includes identifying slowness and/or amplitude values that contribute to a model. The method also includes estimating the model based at least in part on the identified slowness and/or amplitude values. The method also includes outputting a result for a source side wavefield and a receiver side wavefield using the model and at least one of the first or second basis functions.

In another embodiment, the method includes acquiring seismic data that was collected using a multi-measurement streamer. The seismic data is acquired in response to two or more closely spaced shots. The method also includes processing the acquired streamer data from the two or more closely spaced shots using multi-channel reconstruction. The method also includes outputting processed source and receiver data at output locations.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 7A illustrates a desired reconstruction, FIG. 7B illustrates a reconstruction using a single source, and FIG. 7C illustrates a reconstruction using multiple sources, according to an embodiment.

DETAILED DESCRIPTION

Figure 2:
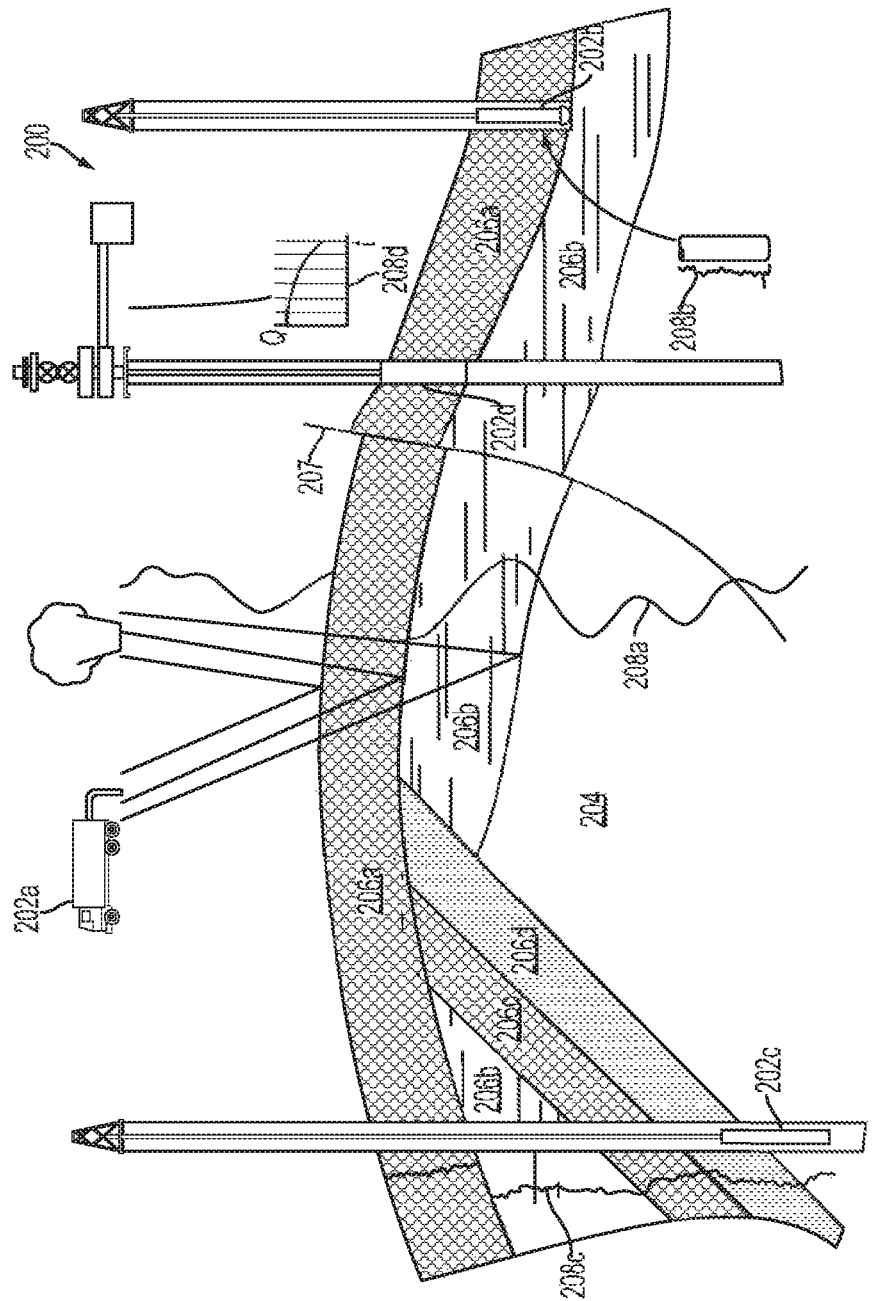

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms.

These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
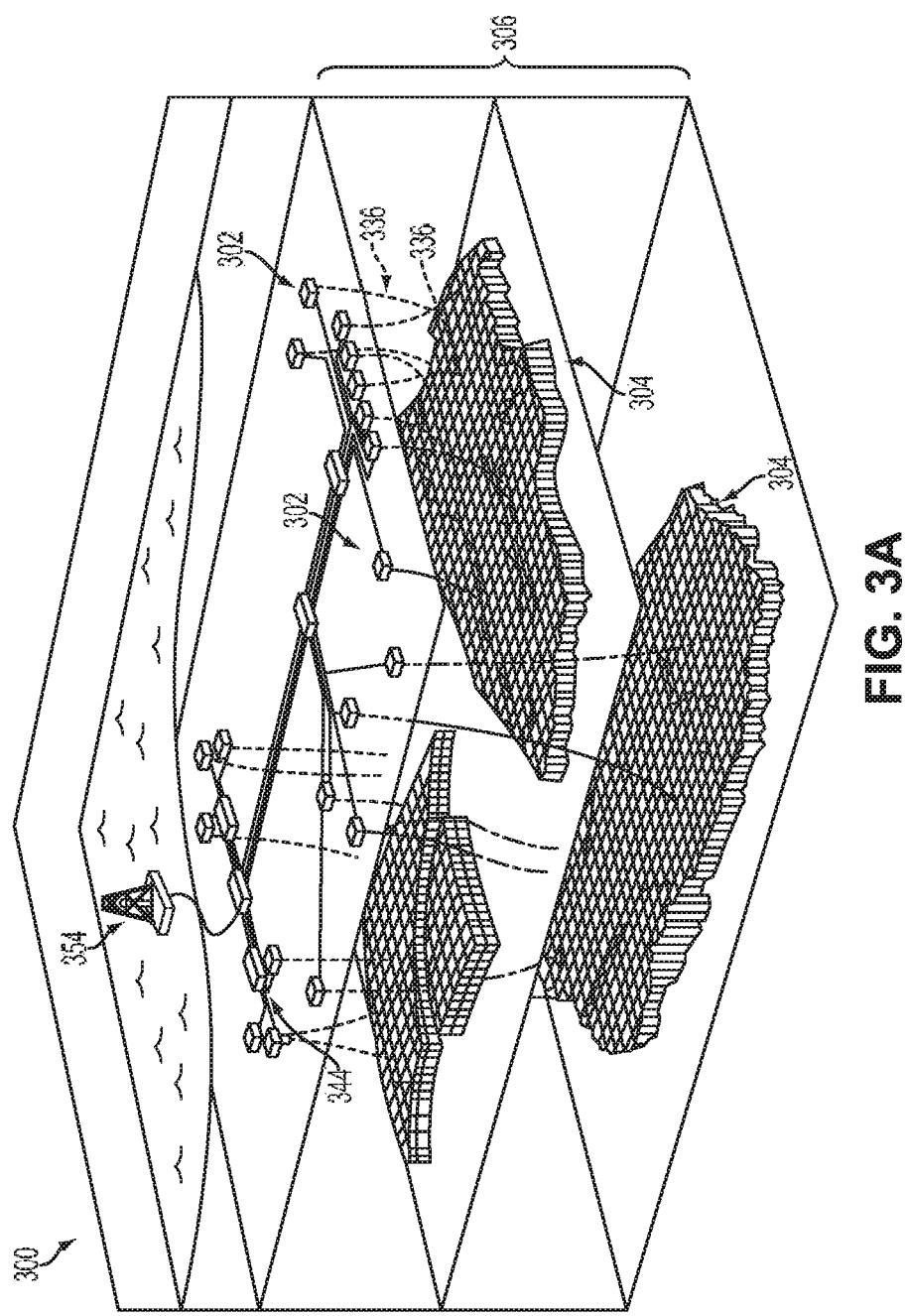

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
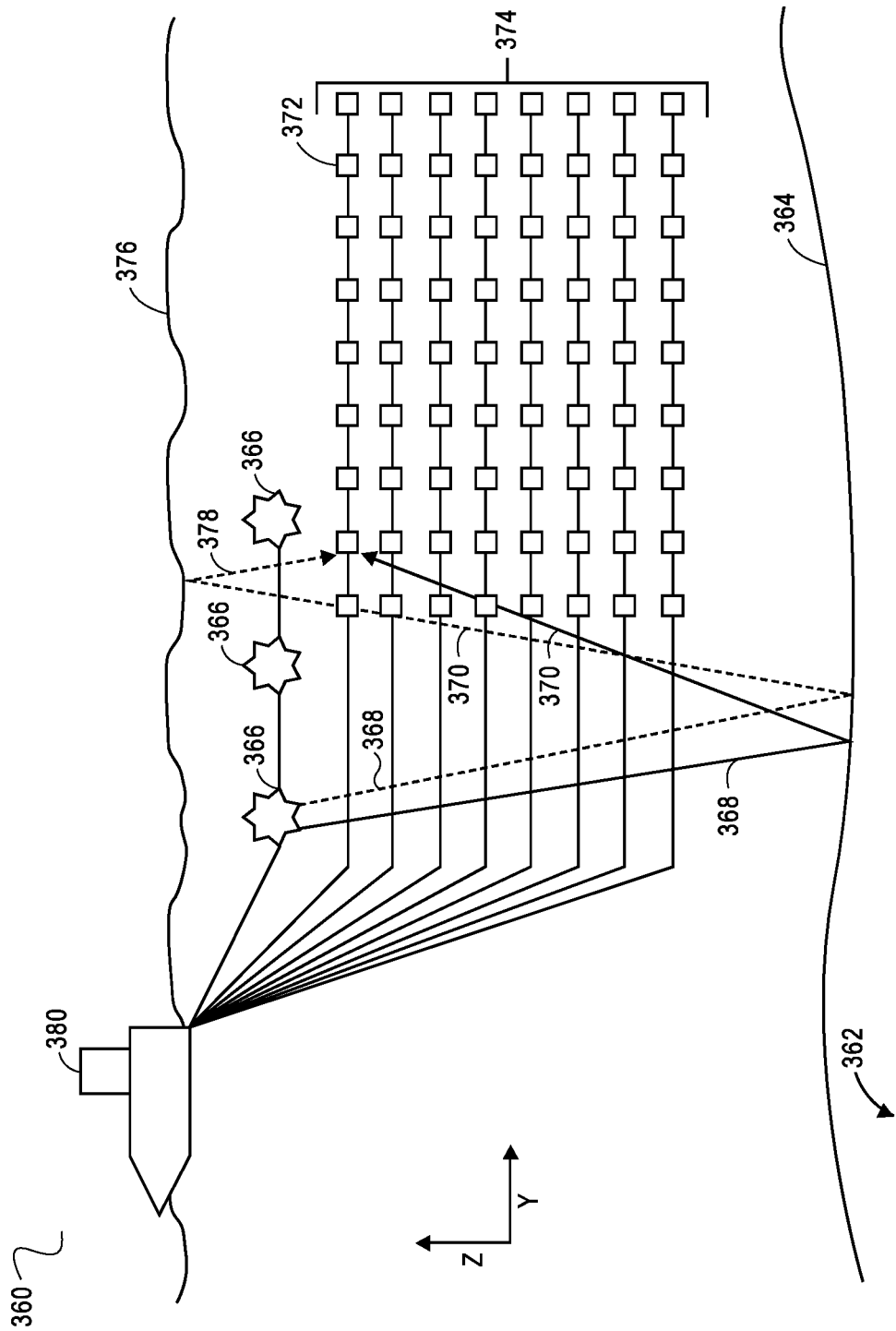

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

In the present disclosure, a method for wavefield reconstruction (e.g., seismic imaging) using multi-measurement streamers is provided. In an embodiment of the present method, rather than reconstructing data for each shot individually, the data for multiple shots is reconstructed simultaneously. This "multi-shot" processing strategy takes advantage of the fact that (for at least some in-line source sampling intervals, e.g., between 12.5 m and 50 m) the seismic wavefield varies slowly and smoothly.

Further, the present disclosure provides an embodiment of a processing strategy that solves a source and receiver side problem simultaneously, and can be extended to include additional source-side effects, such as source-side deghosting, source-side reconstruction, simultaneous source separation, and so on.

The systems and methods described herein use information recorded across multiple activations of the seismic sources, rather than the use of information recorded from a single seismic source. For example, data from multiple sources may be input, and the reconstructed data corresponding to those multiple sources is output. This multiple-shot approach allows for robust results in the presence of strong noise, as noise may be incoherent from shot-to-shot. This can provide a better quality of processed output.

Additionally, the use of a higher-dimensional representation allows for more accurate reconstruction of wavefields generated by complex geological structures. If data quality is already sufficient, then survey parameters that control data quality can be relaxed. The uplift in quality offered by the new approach accounts for this relaxation of survey parameters. For example, increasing the spacing between seismic streamers can reduce data quality, but can have an impact on survey efficiency. The systems and methods described herein thus allow this efficiency improvement without impacting the data quality.

Further, by solving multiple processing steps simultaneously, processing turnaround time can be decreased, and quality can be improved, as errors may not propagate from step-to-step. The systems and methods disclosed herein may provide these benefits and others (when compared to conventional systems and methods) at least in part by defining one or more basis functions that describe a window (partition) of the multi-shot data set that includes a source dimension, decomposing the multi-shot data using the basis functions to create a model that describes the multi-shot data, defining one or more basis functions describing a desired output source and receiver dataset, and/or combing those output basis functions with the decomposed model, to provide an output dataset with desired characteristics.

In one embodiment, the method includes the acquisition of seismic data using a multi-measurement streamer system. A multi-measurement streamer records the acoustic pressure in the water, together with the vertical and horizontal pressure gradients. Pressure gradients can be measured in the water using, for example, particle velocity sensors, or accelerometers. The sensors along the streamer (or channels) are densely spaced, for example, at 6.25 m. Such a streamer system may be deployed behind a seismic survey vessel. The streamers may be at least several kilometers long, and are spaced at approximately regular intervals in the cross-line direction (i.e., transverse to the direction of sailing). This spacing may be from 50 to 150 m, depending on the water depth, assumed complexity of the geological formation being surveyed, and survey objectives. At least one seismic source array may be deployed as part of the survey. This source array can be towed behind the survey vessel, or in some situations can be towed behind a dedicated source vessel. The source array can include airgun sources or marine vibrators. As the survey proceeds, the source is fired at (close to) regular intervals that may range from 12.5 m to 50 m.

Single-Source Reconstruction

In single-source reconstruction of multi-measurement wavefields, the data can be split into overlapping windows. These windows are defined as functions of both time and position. The spatial window is defined as a fixed window in space incorporating a number of streamers, and a number of channels in each streamer. The time window is defined as a number of time samples. In some instances, the data is transformed into the Fourier domain in one or more of the windowed dimensions. For example, a Fast Fourier Transform to the time domain provides the same window of data in the frequency-space domain. Defining frequency f, the in-line channel co-ordinate $x_{rec}$, and the corresponding cross-line cable co-ordinate $y_{rec}$, allows the window of data to be defined as $d_i(f, x_{rec}, y_{rec})$. The subscript i corresponds to the type of measurement made, for example, the pressure, the vertical pressure gradient, and/or the horizontal pressure gradient.

One particular type of reconstruction method involves estimating the frequency-slowness spectrum of the data. For a single shot, this spectrum can be defined as $D(f, p_x, p_y)$, where $p_x$, and $p_y$ correspond to the x- and y-component of slowness. Given a model of the wavefield in this transform domain, $m(f, p_x, p_y)$, the data can be described by the combination of that model, and a set of basis functions, $b_i(f, x_{rec}, y_{rec}, p_x, p_y)$, where the subscript i again refers to the type of measurement that has been made.

$$d_i(f,x_{rec},y_{rec})=\Sigma_{p_x,p_y}m(f,p_x,p_y)b_i(f,x_{rec},y_{rec},p_x,p_y) \quad (1)$$

The basis functions are chosen to represent each of the measurements, and can be used to describe the seismic wavefield in a particular transform domain. The basis functions describe the physics of each measurement, for example, if $d_i(f, x_{rec}, y_{rec})$ corresponds to the cross-line pressure gradient, then $b_i(f, x_{rec}, y_{rec}, p_x, p_y)$ describes the cross-line pressure gradient. Other effects, such as the receiver side ghost can also be described. The transform domain is chosen as one where the wavefield can be expressed by a few components, as this facilitates the reconstruction of the wavefield in directions where it has been sparsely sampled.

In matching pursuit reconstruction, the data in the transform domain can be estimated as, $$D(f,p_x,p_y)=\Sigma_i \Sigma_{x_{rec},rec} d_i(f,x_{rec},y_{rec})b_i(f,x_{rec},y_{rec},p_x,p_y) \quad (2)$$

This estimated transform, together with mathematical expressions for the physics of each measurement, is used to identify optimum slowness and amplitude values that contribute to an estimate of the model $m(f, p_x, p_y)$. This is done iteratively, with the input data $d_i(f, x_{rec}, y_{rec})$ being updated after each iteration. After a number of iterations, the estimated model is combined with a set of basis functions that define the desired output data at locations defined by [x_out, y_out], $$d(f,x_{out},y_{out})=\Sigma_{p_x,p_y}m(f,p_x,p_y)b^{out}(f,x_{out},y_{out},p_x,p_y) \quad (3)$$

Where, for example, the output data could correspond to the up-going pressure wavefield, down-going pressure wavefield, and/or total pressure wavefield that would have been observed at locations between the physical streamer positions.

Multi-Source Reconstruction

Figure 4:
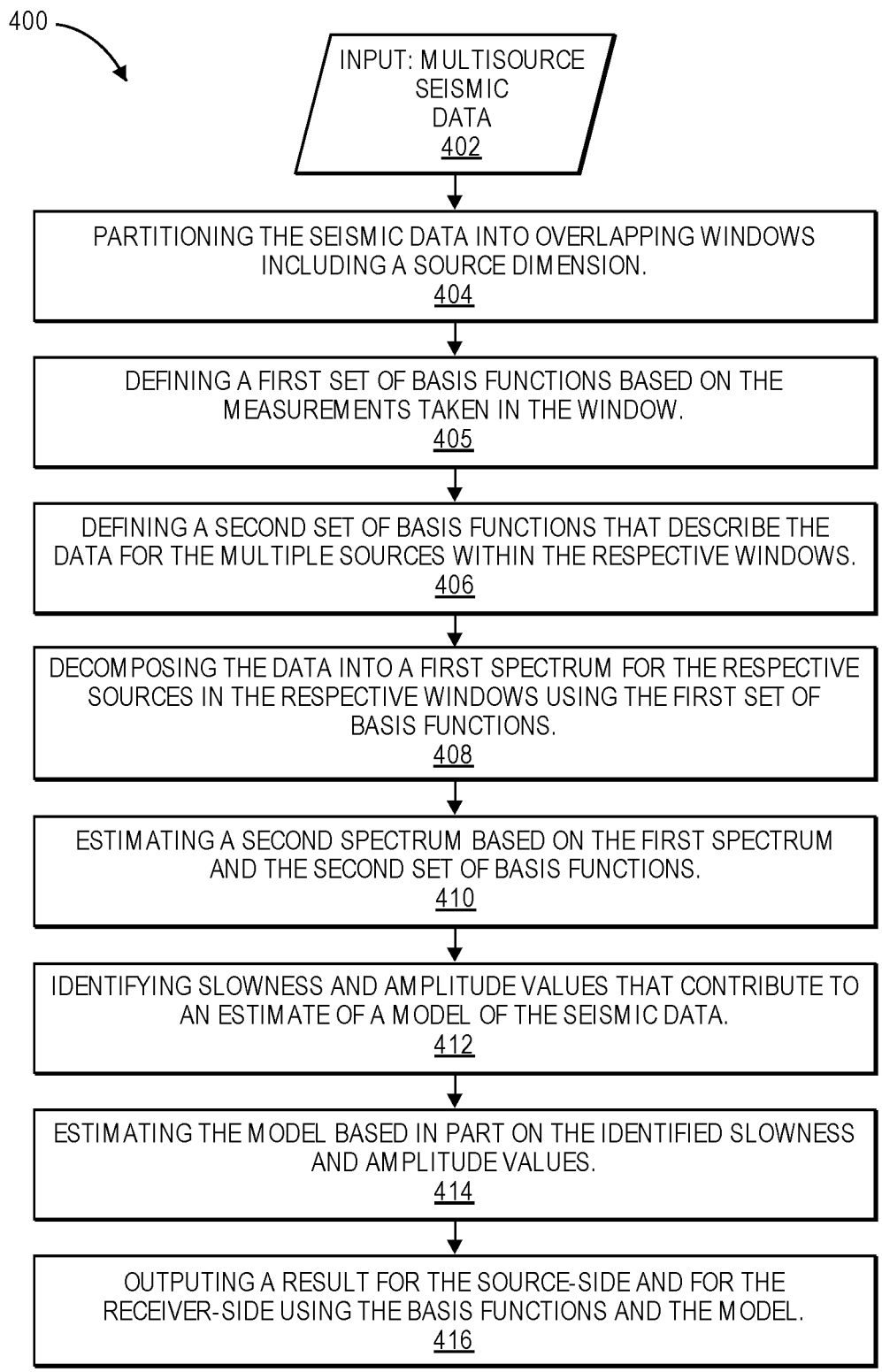
FIG. 4 illustrates a flowchart of a method for seismic imaging, according to an embodiment.

Referring now to FIG. 4, there is shown a flowchart of a method 400 for reconstructing a wavefield (seismic imaging), according to an embodiment. The method 400 may include receiving multi-shot seismic data, as at 402. The data may be acquired using marine streamers, for example, as discussed above. The wavefields may be generated by one or several sources.

In an embodiment, the above-described single-source reconstruction methodology is extended to allow the wavefield to be reconstructed across multiple shots. Following on from the description of the single-source method given above, at 404, the data is partitioned into overlapping windows. The data is windowed in an extra dimension, as compared to the single-source method, however. This additional dimension is the source dimension. For ease of description, sources are described herein as being acquired along a line, and the source coordinate along that line will be defined as $x_{src}$, but this is merely an example, and the sources may be acquired along any geometry and defined appropriately.

The spatial window is again defined as a fixed window in space, and the data in this window is now defined as $d_i(f, x_{rec}, y_{rec})$. For multiple sources, the frequency-slowness spectrum is now be defined as $D(f, p_x, p_y, p_{src})$, where $p_{src}$, is the component of slowness along the source coordinate.

As at 405, a first set of basis functions $b_i(f, x_{rec}, y_{rec}, p_x, p_y)$, as explained above for the single-source method, is defined.

As at 406, a second set of basis functions, $b_j^s(f, x_{src}, p_{src})$ is defined that represents the data across the multi-sources within the window, where the subscript j allows different types of sources to be accounted for in the same way that the subscript i allows the different measurements to be account for above.

For each of the sources, the data is decomposed into a first spectrum based in part on the first basis functions for the respective sources for the respective windows, as at 408. For example, the first spectrum may be an estimated receiver slowness spectrum, according to the following:

$$D_j(f, p_x, p_y, x_{src}) = \Sigma_i \Sigma_{x_{rec}, y_{rec}} d_i(f, x_{rec}, y_{rec}, x_{src}) b_i(f, x_{rec}(x_{src}), y_{rec}(x_{src}), p_x, p_y), \quad (4)$$

where now the receiver coordinates $x_{rec}$, $y_{rec}$ depend on the source, as the streamers can change shape slightly from shot-to-shot. In another embodiment, the first spectrum may instead be an intercept-time slowness spectrum, or any other suitable spectrum, with the slowness spectrum discussed herein being merely an illustrative example.

In the multi-source case, rather than using the estimated spectra (4) to reconstruct the wavefield, the method 400 includes, at 410, estimating a second spectrum $D(f, p_x, p_y, p_{src})$ based on both the receiver wavefield and the source wavefield, e.g., using the second set of basis functions and the first spectrum, as follows:

$$D(f, p_x, p_y, p_{src}) = \Sigma_j \Sigma_{x_{src}} D_j(f, p_x, p_y, x_{src}) b_j^s(f, x_{src}, p_{src}) \quad (5)$$

The second spectrum ties together the source and receiver wavefields, and permits the reconstruction of the wavefield across the multiple receiver locations and the multiple source locations. This spectrum, together with mathematical expressions for the physics of the measurements (and potentially different types of source), is used, as at 412, to identify slowness and amplitude values that contribute to an estimate of the model $m(f, p_x, p_y, p_{src})$, which may be estimated at 414. As above, this may be done iteratively, with the input data $d_i(f, x_{rec}, y_{rec}, x_{src})$ being updated after individual iterations. After a number of iterations, as at 416, the estimated model may be combined with a set of basis functions that define the desired output data at locations defined by x_s_out, $$d(f, x_{out}, y_{out}, x_{s\_out}) = \Sigma_{p_x p_y p_{src}} m(f, p_x, p_y, p_{src}) b^{out}(f, x_{out}, y_{out}, p_x, p_y) b^{s\_out}(f, x_{s\_out}, p_{src}), \quad (6)$$

where, for example, the output data on the receiver-side may correspond to the up-going pressure wavefield, the down-going pressure wavefield, and/or the total pressure wavefield. It may further correspond to data at locations where a physical receiver/streamer was not placed during data acquisition (i.e., an interpolated data point). The output data on the source-side may correspond to the input source locations, source locations between the input source locations, and/or source wavefields with source signature, radiation pattern, and free surface effects removed.

Thus, the present method allows source and receiver side problems to be solved together. Accordingly, this method may include a solution for the reconstructed wavefield that accounts for noise, since noise is incoherent from shot-to-shot, as well as a solution that takes advantage of the representation of wavefields becoming sparser in higher dimensions.

In some embodiments, blocks 405 and 406 may be combined to achieve a similar result. In some embodiments, blocks 408 and 410 may also or instead by combined.

EXAMPLE

Figure 5:
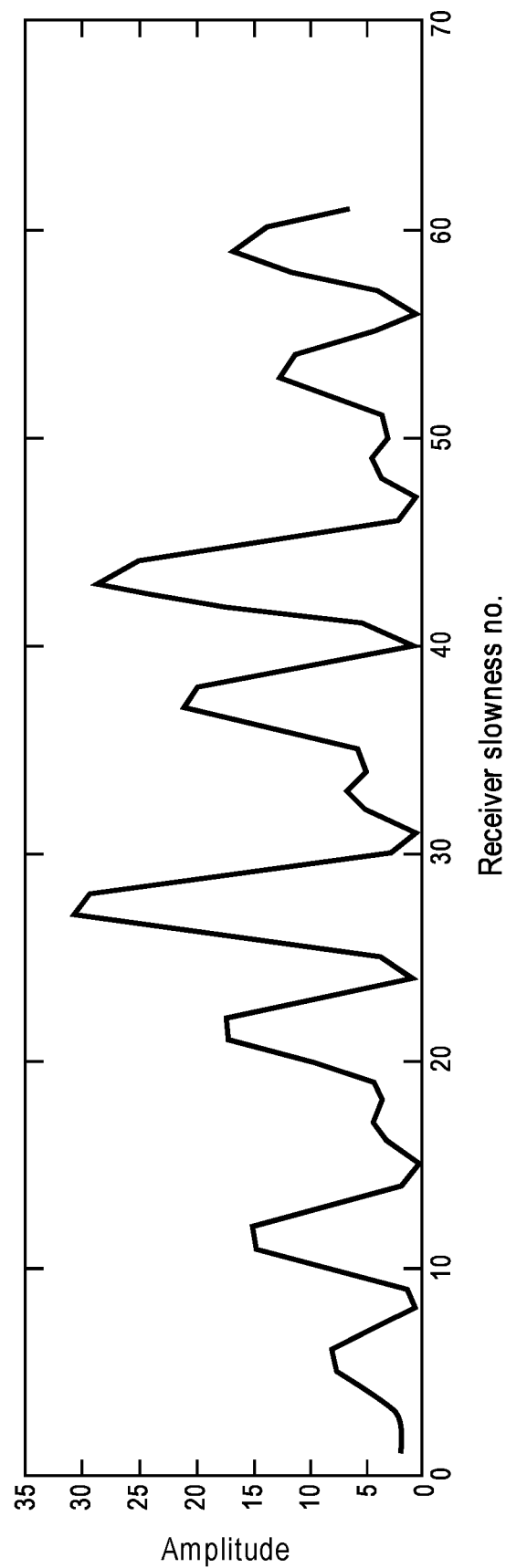
FIG. 5 illustrates an example of a slowness spectrum at a given frequency in a seismic data set for one receiver dimension computed as part of a single-source matching pursuit solution, according to an embodiment.

A simple example is now shown for a dataset with a single-receiver dimension, and a single source dimension. There are five receivers spaced at 75 m in the y-direction, and 5 sources space at 45 m in the x-direction. FIG. 5 shows a graph 500 of the estimated slowness transform, $D(f, p_y)$, for a given frequency, computed as part of the single-source matching pursuit solution. In this case there are two measurements on the receiver side: the pressure wavefield (i=1) and the pressure gradient in the y-direction (i=2).

Figure 7C:
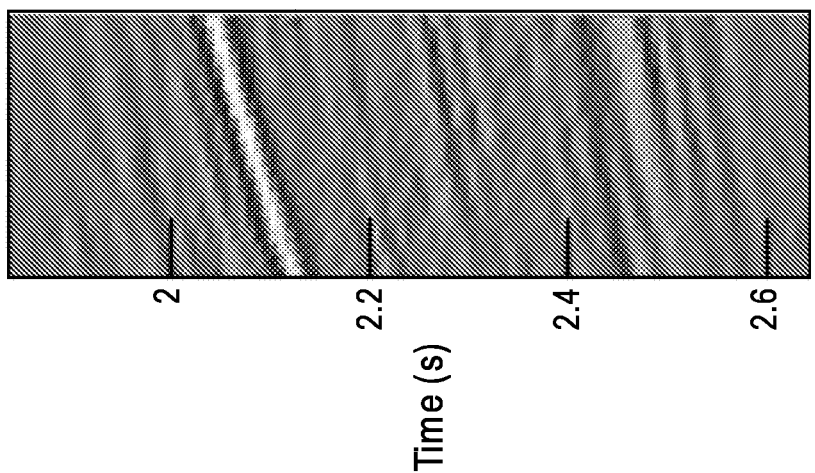
FIGS. 7A, 7B, and 7C illustrate a reconstructed seismic images. In particular.
Figure 7B:
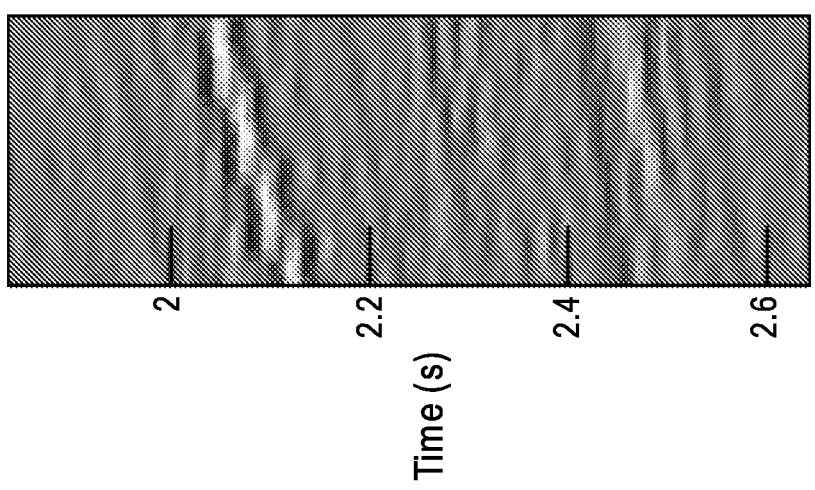
Figure 7A:
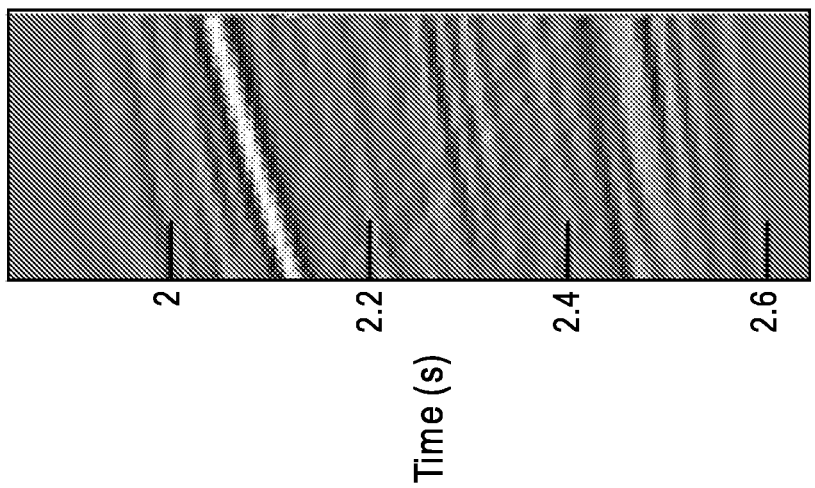

At the first iteration, the correct slowness value should be picked at receiver slowness number 43; however, from the transform in FIG. 5, the matching pursuit solution picks the value at receiver slowness number 28. This leads to a poor quality reconstruction result. This result is shown in the time domain in FIG. 7B, where the desired output data is the total pressure wavefield recorded at a sampling of 15 m (versus 75 m for the input data). Since this is a synthetic example, the desired output data can be modelled precisely, and this is shown in FIG. 7A, demonstrating that there are errors in this particular reconstruction result.

Figure 6:
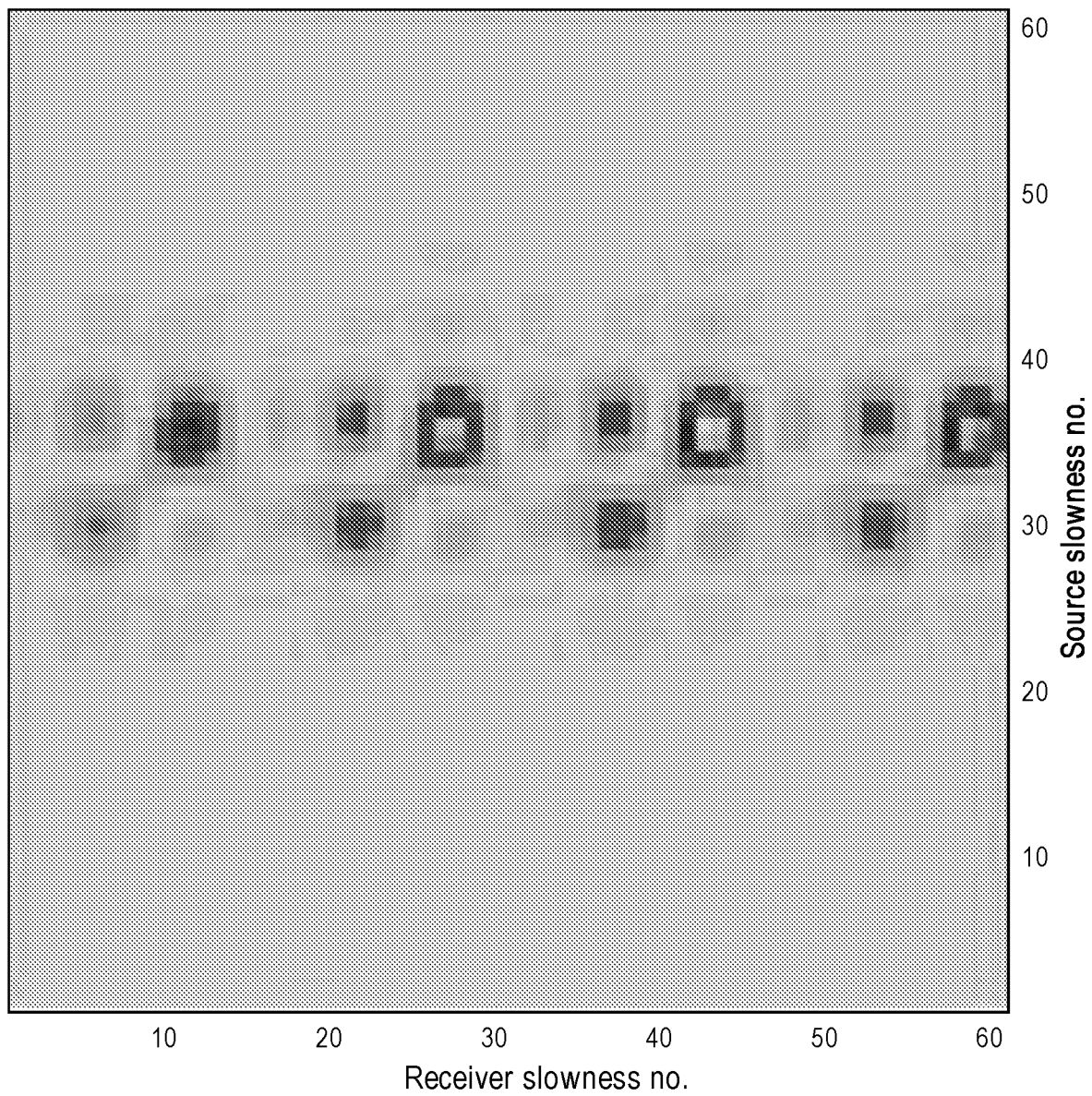
FIG. 6 illustrates the slowness spectrum of FIG. 1, but for one receiver dimension and a source dimension, according to an embodiment.

FIG. 6 shows the equivalent estimated slowness transform, but for the multi-source case, $D(f, p_y, p_{src})$. A monopole type source is used here (j=1). The spectrum is now plotted as a two-dimensional image, rather than the line plot as in FIG. 5. This two-dimensional spectrum is computed for the five input receiver locations, and the five sources. At the first iteration, the correct slowness should be picked as receiver slowness number 43 and source slowness number 37, and this is indeed the case. By performing the transform over both source and receiver coordinates the data becomes sparser (as seen by the spread of energy in the source slowness direction in FIGS. 7A-7C), and the matching pursuit process correctly identifies the component. The effect of this is seen in FIG. 7C, where the reconstructed data in the time-offset domain corresponding to that in FIG. 7B is shown. The uplift in the reconstruction result is clear when comparing FIG. 7C to the expected result in FIG. 7A.

Approximate Solutions

Equation (5) may not be computed using some of the possible receiver slowness values. For example, from the results of equation (4), it may be possible to identify the largest receiver slownesses, which will be the receiver slownesses likely to contribute values to the result of equation 5. This may be a case of stacking the absolute values of the different receiver slowness spectra for the different sources, $$D^{av}(f, p_x, p_y) = \Sigma_{x_{src}} |D(f, p_x, p_y, p_{src})| \quad (7)$$

From this average amplitude spectra, the larger components can be selected (for example, the largest 25 to 50% of values may be used), and those components are used in computing the combined receiver-source spectrum in equation (5). Provided the percentage value is chosen appropriately, this may reduce the number of computations to find the result in equation (5).

In the above description, different source components j are mentioned. For the marine vibrator, these components j can correspond to source with different directionality patterns that enable, amongst other applications, beyond Nyquist source reconstruction.

The above-described method employs an iterative matching pursuit process, in which a spectrum is computed at the individual iterations. In some embodiments of matching pursuit, the at least some iterations may be performed without explicitly re-computing the full spectrum. Rather, the spectrum itself can be updated at each iteration.

The multi-source solution can be extended to include separation of simultaneous sources. In this case, the basis functions for the sources correspond to two or more source wavefields, with the encoding of the sources also described within the basis functions. The desired output on the source-side in this case may correspond to the data from the simultaneous sources as if they had been fired separately.

When choosing the fixed window for multi-source solution, there may be two options. One is to fix the window with respect to the streamers themselves, and the other is to fix the window with respect to the Earth. In the first option, the window for each shot corresponds to the same part of the streamer. In the second option, the window for each shot will correspond to a different part of the streamer.

While the above solution describes a process of using a matching pursuit solution to estimate the reconstructed wavefield, those skilled in the art will appreciate that other inversion-based methods may be configured to solve the same problem. For example, compressive sensing methods, or other methods involving the minimization of an L1-norm.

Combining Information from Multiple Sources

Figure 8:
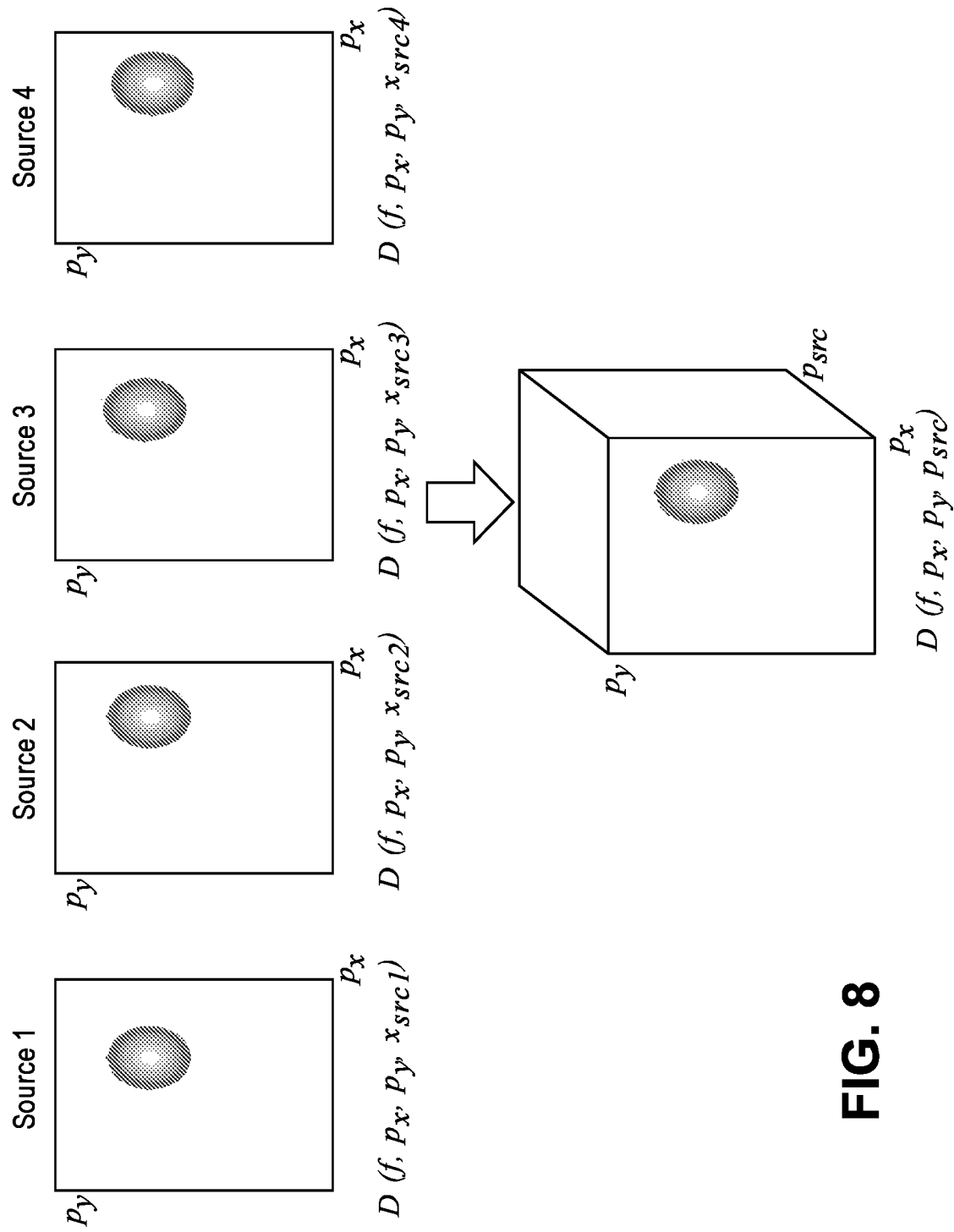
FIG. 8 illustrates a conceptual view of a combination of data acquired from five sources, according to an embodiment.

FIG. 8 illustrates a conceptual view of combining information from multiple sources, according to an embodiment. The top row shows the slowness transforms corresponding to equation 4. These slowness transforms may individually contain the information at one frequency from one of five sources (e.g., source 1 to source 5) observed on the same 2D receiver array. The grey region represents a particular event in the seismic data.

These are computed independently for each source. The sources are closely spaced (e.g., from 12.5 to 50 m separation), and the information from source to source may, in this example, not vary quickly. Thus, the 5 plots appear similar, but are not the same. The similarity can be exploited by using a set of basis functions that is dependent on the source position ($x_{src}$). Equation (5) combines the top 5 plots using the basis functions dependent on source position. The five 2D slowness transforms then become a single 3D slowness transform that is sketched at the bottom of FIG. 8.

Figure 9:
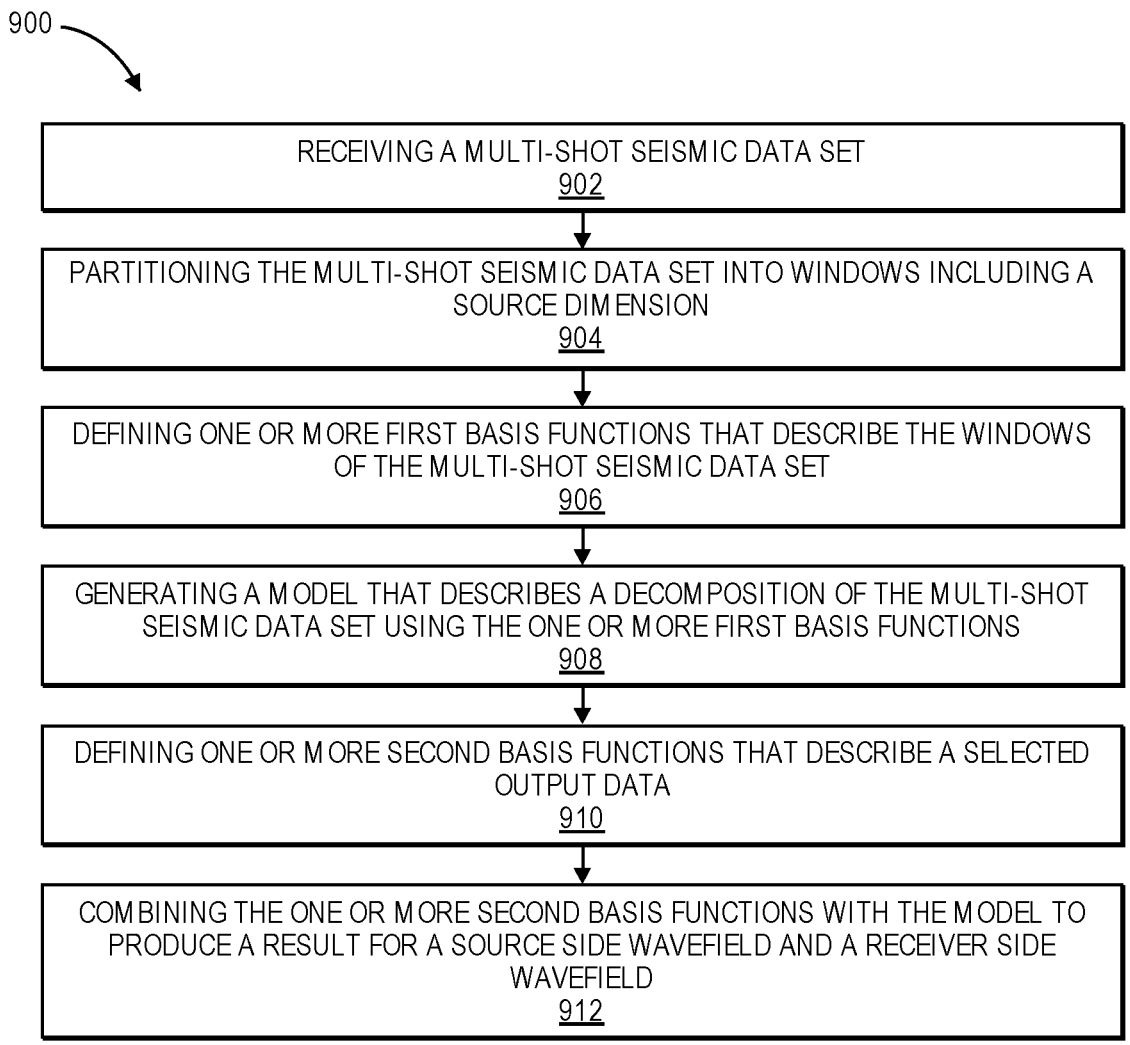
FIG. 9 illustrates a flowchart of a method for seismic imaging, according to an embodiment.

FIG. 9 illustrates a flowchart of a method 900 for seismic imaging, according to an embodiment. The method 900 may include receiving a multi-shot seismic data set, as at 902. The data set may be collected using one or more streamers having recorders configured to detect seismic waves that propagate through a subterranean domain. The method 900 may also include partitioning the multi-shot seismic data set into windows including a source dimension, as at 904. The windows may represent spatially-overlapping areas. The method 900 may also include defining one or more first basis functions that describe the windows of the multi-shot seismic data set, as at 906. In at least one embodiment, two or more first basis functions may be used and combined. The method 900 may also include generating a model that describes a decomposition of the multi-shot seismic data set using the one or more first basis functions, as at 908. The model may describe the data when combined with the basis functions. The method 900 may also include defining one or more second basis functions that describe a selected output data, as at 910. The second set of basis functions may be used because the output dataset may have a different configuration than the input dataset. The method 900 may also include combining the one or more second basis functions with the model to produce a result for a source side wavefield and a receiver side wavefield, as at 912. The result for the receiver-side wavefield may include an up-going pressure wavefield, a down-going pressure wavefield, a total pressure wavefield, or a combination thereof. The result for the source-side wavefield may include input source locations, source locations between the input source locations, and/or source wavefields with source signature, radiation pattern, and free surface effects removed.

Figure 10:
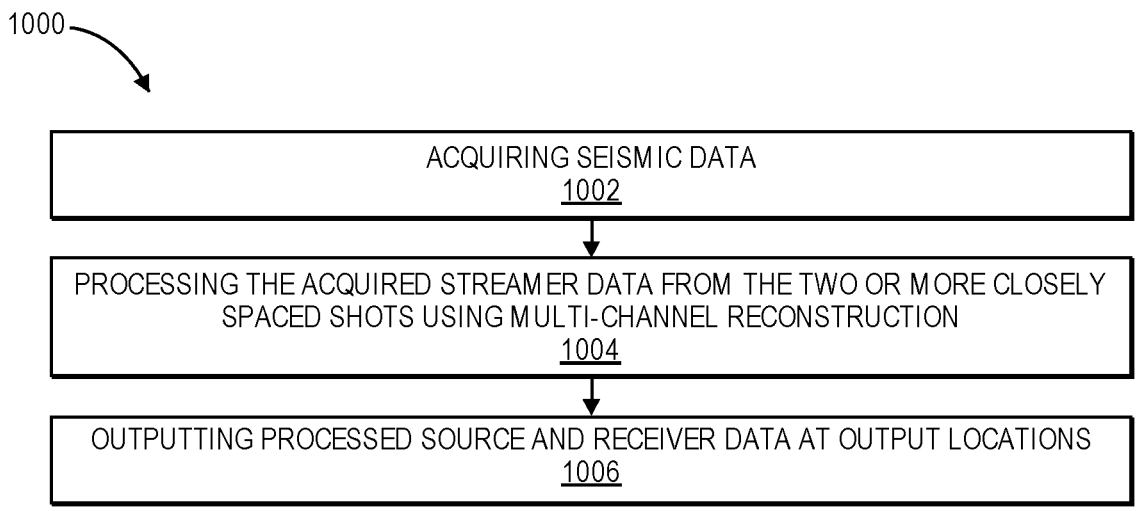
FIG. 10 illustrates a flowchart of another method for seismic imaging, according to an embodiment.

FIG. 10 illustrates a flowchart of yet another method 1000 for seismic imaging, according to an embodiment. The method 1000 may include acquiring seismic data, as at 1002. The seismic data may be collected using a multi-measurement streamer. The seismic data may be acquired in response to two or more closely spaced shots from a seismic source. The seismic source may be an airgun. In another embodiment, the seismic source may be a marine vibrator that emits wavefields with different directivity patterns.

The multi-measurement streamer may contain at least one pressure sensor, and at least one of an accelerometer, geophone, and strain sensor. The method 1000 may also include processing the acquired streamer data from the two or more closely spaced shots using multi-channel reconstruction, as at 1004. Processing may include defining a first set of basis functions that describe the multiple measurements for an individual streamer. Processing may also include defining a second set of basis functions that describe a wavefield emitted by multiple sources. Processing may also include identifying a subset of basis functions and corresponding amplitude factors that fit the multiple measurements and multiple sources. Processing may also include reconstructing a seismic wavefield using equivalent basis functions describing the output wavefield. The subset of basis functions and corresponding amplitude factors may be computed using a matching pursuit method. The reconstruction method may be a sparse inversion process. The processed wavefield represents the downgoing wavefield from the seismic source locations, and the upgoing wavefield at the receiver locations.

The method 1000 may also include outputting processed source and receiver data at output locations, as at 1006. At least one of the output locations is a location where a source or receiver was not present during the survey.

In at least one embodiment, two or more sets of closely-activated shots are activated simultaneously, and the processed wavefield at the output source and receiver locations represents the wavefield as if the two or more sets of shots had been active independently.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 11:
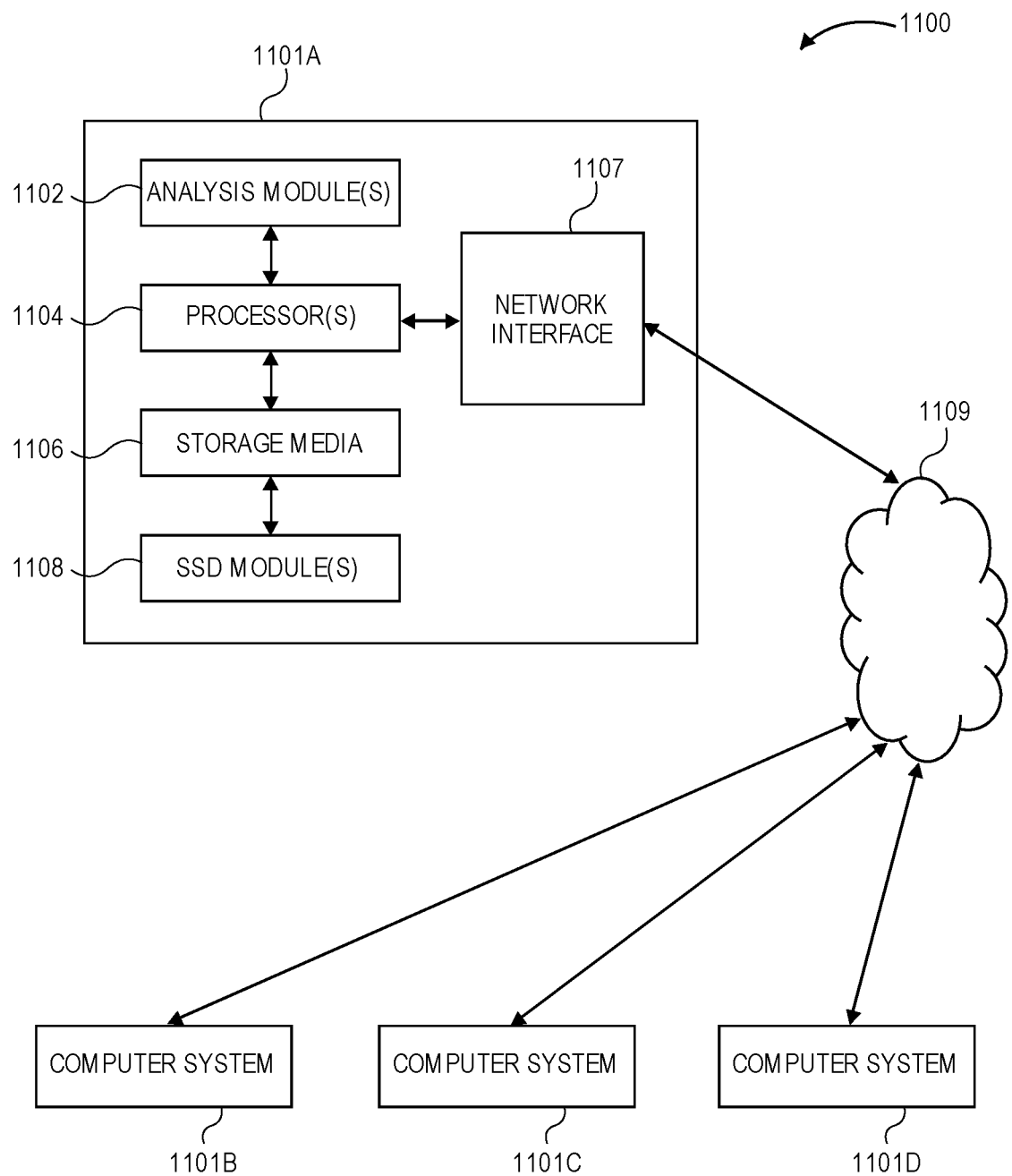
FIG. 11 illustrates a schematic view of a computing system for performing at least a portion of the method(s), according to an embodiment.

In some embodiments, any of the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis module(s) 1102 configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1109 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY° disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1100 contains one or more wavefield reconstruction module(s) 1108. In the example of computing system 1100, computer system 1101A includes the wavefield reconstruction module 1108. In some embodiments, a single wavefield reconstruction module may be used to perform some or all aspects of one or more embodiments of the methods. In alternate embodiments, a plurality of wavefield reconstruction modules may be used to perform some or all aspects of methods.

It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:
1. A computing system comprising:
one or more processors; and
a memory system comprising one or more non-transitory computer-readable media storing instructions that, when executed by at least one of the one or more processors, cause the computing system to perform operations, the operations comprising:
acquiring seismic data that was collected using a multi-measurement streamer, wherein the seismic data is acquired in response to two or more shots at spatial intervals;
processing the acquired seismic data from the two or more shots using multi-channel reconstruction, the processing comprising:

partitioning the acquired seismic data set into windows including a source dimension;
defining one or more first basis functions that describe the windows of the acquired seismic data;
generating a model that describes a decomposition of the acquired seismic data using the one or more first basis functions;
defining one or more second basis functions that describe a selected output data; and
combining the one or more second basis functions with the model to produce a result for a source side wavefield and a receiver side wavefield; and
in response to processing the acquired seismic data, outputting processed source and receiver data at output locations.

2. The computing system of claim 1, wherein the windows represent spatially overlapping areas.

3. The computing system of claim 1, wherein the selected output data on the receiver-side comprises an up-going pressure wavefield, a down-going pressure wavefield, a total pressure wavefield, or a combination thereof.

4. The computing system of claim 1, wherein the selected output data on the source-side comprises input source locations, source locations between the input source locations, and/or source wavefields with source signature, radiation pattern, and free surface effects removed.

5. A non-transitory computer-readable medium storing instructions that, when executed by at least one processor of a computing system, cause the computing system to perform operations, the operations comprising:
acquiring seismic data that was collected using a multi-measurement streamer, wherein the seismic data is acquired in response to two or more shots at spatial intervals;
processing the acquired streamer data from the two or more shots using multi-channel reconstruction, the processing comprising:
partitioning the acquired seismic data set into windows including a source dimension;
defining a first basis function based on data in one of the windows for individual sources;
defining a second basis function that describes data for multiple sources in the one of the windows;
decomposing the data into a first spectrum for the individual sources in the one of the windows using the first basis function;
estimating a second spectrum based on the first spectrum and the second basis function;
estimating a model based at least in part on slowness values, amplitude values, or both;
defining a third basis function that describes a selected output data; and
outputting a result for a source side wavefield and a receiver side wavefield using the model and the third basis function.

6. The computer-readable medium of claim 5, wherein the windows represent spatially overlapping areas.

7. The computer-readable medium of claim 5, wherein the estimating the second spectrum comprises calculating a slowness spectrum.

8. The computer-readable medium of claim 5, wherein the selected output data on the receiver-side comprises an up-going pressure wavefield, a down-going pressure wavefield, a total pressure wavefield, or a combination thereof.

9. The computer-readable medium of claim 5, wherein the selected output data on the source-side comprises input source locations, source locations between the input source locations, and/or source wavefields with source signature, radiation pattern, and free surface effects removed.

10. A method for seismic imaging, comprising
acquiring seismic data that was collected using a multi-measurement streamer, wherein the seismic data is acquired in response to two or more shots at spatial intervals;
processing the acquired seismic data from the two or more shots using multi-channel reconstruction, the processing comprising:
defining a first set of basis functions that describe multiple measurements for an individual streamer;
defining a second set of basis functions that describe a wavefield emitted by multiple sources;
identifying a subset of basis functions and corresponding amplitude factors that fit the multiple measurements and multiple sources;
defining a set of output basis functions describing a desired output wavefield, wherein the output basis functions are selected to correspond to the subset of basis functions; and
reconstructing a seismic wavefield using the output basis functions, together with the identified amplitude factors; and
in response to processing the acquired seismic data, outputting processed source and receiver data at output locations.

11. The method of claim 10, wherein at least one of the output locations is a location where a source or receiver was not present during a survey where the seismic data was acquired.

12. The method of claim 10, where a seismic source used to generate the shots is an airgun source.

13. The method of claim 10, where a seismic source used to generate the shots is a marine vibrator.

14. The method of claim 13, wherein the marine vibrator emits wavefields with different directivity patterns.

15. The method of claim 10, where the multi-measurement streamer contains at least one pressure sensor, and at least one of an accelerometer, geophone, and strain sensor.

16. The method of claim 10, where the subset of basis functions and corresponding amplitude factors are computed using a matching pursuit method.

17. The method of claim 10, where the reconstructed seismic wavefield represents a downgoing wavefield from one or more seismic source locations, and an upgoing wavefield at one or more receiver locations.

18. The method of claim 10, wherein two or more sets of shots are activated simultaneously, and the reconstructed seismic wavefield at output source and receiver locations represents the wavefield as if the two or more sets of closely spaced shots had been activated independently.

* * * * *